United States Patent
Vemulapati et al.

(10) Patent No.: US 10,421,415 B1
(45) Date of Patent: Sep. 24, 2019

(54) TRIM APPLIQUE AND DOOR TRIM APPLIQUE RETENTION SYSTEM

(71) Applicant: FORD GLOBAL TECHNOLOGIES, LLC, Dearborn, MI (US)

(72) Inventors: Satyanarayana Raju Vemulapati, Westland, MI (US); Zhibing Deng, Northville, MI (US); Deepak Patel, Canton, MI (US); Vijaykumar Hegde, Canton, MI (US); Scott Holmes Dunham, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/914,650

(22) Filed: Mar. 7, 2018

(51) Int. Cl.
*B60R 13/02* (2006.01)

(52) U.S. Cl.
CPC ...... *B60R 13/0206* (2013.01); *B60R 13/0243* (2013.01)

(58) Field of Classification Search
CPC . B60R 13/02; B60R 13/0206; B60R 13/0243; B60R 13/0237; B60R 13/025; B60R 13/2056

USPC ................... 296/39.1, 1.08, 146.7
See application file for complete search history.

(56) References Cited

U.S. PATENT DOCUMENTS

| 5,080,393 | A | 1/1992 | Dixon, Jr. et al. |
| 6,000,959 | A | 12/1999 | Curtindale et al. |
| 7,793,972 | B2 | 9/2010 | Downey |
| 7,794,008 | B2 | 9/2010 | Hall et al. |
| 8,177,255 | B2* | 5/2012 | Le Hoang ............ B60R 21/215 280/728.3 |
| 8,733,820 | B2 | 5/2014 | Vemulapati et al. |
| 9,302,631 | B2 | 4/2016 | Lee |
| 9,376,067 | B2* | 6/2016 | Stanczak ............ B60R 13/0206 |
| 2004/0164525 | A1* | 8/2004 | Gray .................... B60R 21/216 280/728.3 |
| 2005/0206193 | A1 | 9/2005 | Sweers et al. |
| 2008/0238112 | A1 | 10/2008 | Eberlein et al. |
| 2013/0193674 | A1* | 8/2013 | Ory ..................... B60R 21/216 280/728.3 |

\* cited by examiner

*Primary Examiner* — Dennis H Pedder
(74) *Attorney, Agent, or Firm* — Vichit Chea; King & Schickli, PLLC (57) ABSTRACT

A door trim applique retention system includes a door trim applique having a body and a tether. The tether has a body attachment point and a tether retention feature. The door trim applique retention system also includes a door inner including a receiver. The retention feature is held in the receiver.

9 Claims, 7 Drawing Sheets

TRIM APPLIQUE AND DOOR TRIM APPLIQUE RETENTION SYSTEM

TECHNICAL FIELD

This document relates generally to the motor vehicle equipment field and, more particularly, to a new and improved trim applique, a door trim applique retention system and related method of securing a door trim applique to a door inner.

BACKGROUND

During a side impact, a vehicle may be subjected to localized intrusion on a door. This localized intrusion may result in door trim detachment from door sheet metal. The detachment of the door trim in turn could block proper deployment of the seat mounted side airbag.

In order to prevent door trim detachment or early detachment, additional screw attachment may be used to secure the door trim to the inner sheet metal. This solution, however, is complicated and results in appearance/craftsmanship degradation.

In an alternative solution a catcher bracket could be utilized. However such a catcher bracket could result in a higher shoulder force. Further, assembly is complicated by the need to carefully insert the cooperating insert bracket into the catcher bracket.

This document relates to a new and improved trim applique as well as to a new and improved door trim applique retention system and a new and improved method of securing a door trim applique to a door inner. Advantageously, the door trim applique retention system retains the door trim applique to the door sheet metal inner for a long enough time to allow for the desired side airbag deployment in response to a triggering side impact event.

SUMMARY

In accordance with the purposes and benefits described herein, a new and improved trim applique is provided. That trim applique comprises a body, including a conduit, and a tether having a body attachment point, a free end and an intermediate portion between the body attachment point and the free end that is received in the conduit.

More particularly, the body may include a tether boss and the body attachment point may comprise a loop at a proximal end of the tether. A fastener is received through the tether boss and the loop.

A tether retention feature is provided at a free end of the tether. The tether retention feature may comprise a cylindrical button. Further, the body may include one or more integral resilient clips that define the conduit which receives the intermediate portion of the tether.

In accordance with an additional aspect, a door trim applique retention system is provided. That door trim applique retention system comprises a door trim applique and a door inner. The door trim applique includes a body and a tether. The tether has a body attachment point and a tether retention feature. The tether retention feature is held in the receiver on the door inner.

The receiver may comprise a keyhole-shaped slot. The tether retention feature may be a cylindrical button including a continuous channel that engages a margin of the door inner around the keyhole-shaped slot.

The body may include a tether boss and the body attachment point may comprise a loop at a proximal end of the tether. A fastener may be received through the tether boss and the loop. The fastener engages a mounting point on the door inner.

The tether retention feature may be provided at a distal end of the tether. The body may include a conduit and the tether includes an intermediate portion between the proximal end and the distal end that is received in that conduit. Still further, the body may include one or more resilient clips that define the conduit which receives the intermediate portion of the tether.

In accordance with still another aspect, a method is provided of securing a door trim applique to a door inner. That method comprises the steps of: a) providing the door trim applique with a tether having slack and a free end, b) attaching the free end of the tether to a receiver on the door inner, c) positioning the door trim applique on the door inner so as to align a boss on the door trim applique with a fastener receiver on the door inner and d) inserting a fastener into the boss and the fastener receiver.

The method may further include the step of taking up the slack in the tether when positioning the door trim applique on the door inner. Further, the method may include the step of inserting a tether retention feature on the free end of the tether receiver on the door inner. Still further the method may include the step of inserting the fastener through a loop on the tether when inserting the fastener into the boss and the fastener receiver.

The method may also include the step of using a keyhole-shaped slot in the door inner as the tether receiver. Further, the method may include the step of engaging a margin of the door inner defining the keyhole-shaped slot with a groove on the tether retention feature when securing the tether retention feature to the tether receiver.

In the following description, there are shown and described several preferred embodiments of the trim applique, the door trim applique retention system and the method of securing a door trim applique to a door inner. As it should be realized, the trim applique, the door trim applique retention system and the related method are capable of other, different embodiments and their several details are capable of modification in various, obvious aspects all without departing from the trim applique, door trim applique retention system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the trim applique, the door trim applique retention system and the method of securing a door trim applique to a door inner and together with the description serve to explain certain principles thereof.

FIG. 1b is perspective view of the B-side of the door trim applique illustrated in FIG. 1a.

Reference will now be made in detail to the present preferred embodiments of the trim applique, door trim applique retention system and related method of securing a door trim applique to a door inner. Examples of these are illustrated in the accompanying drawing figures.

DETAILED DESCRIPTION

Figure 1A:
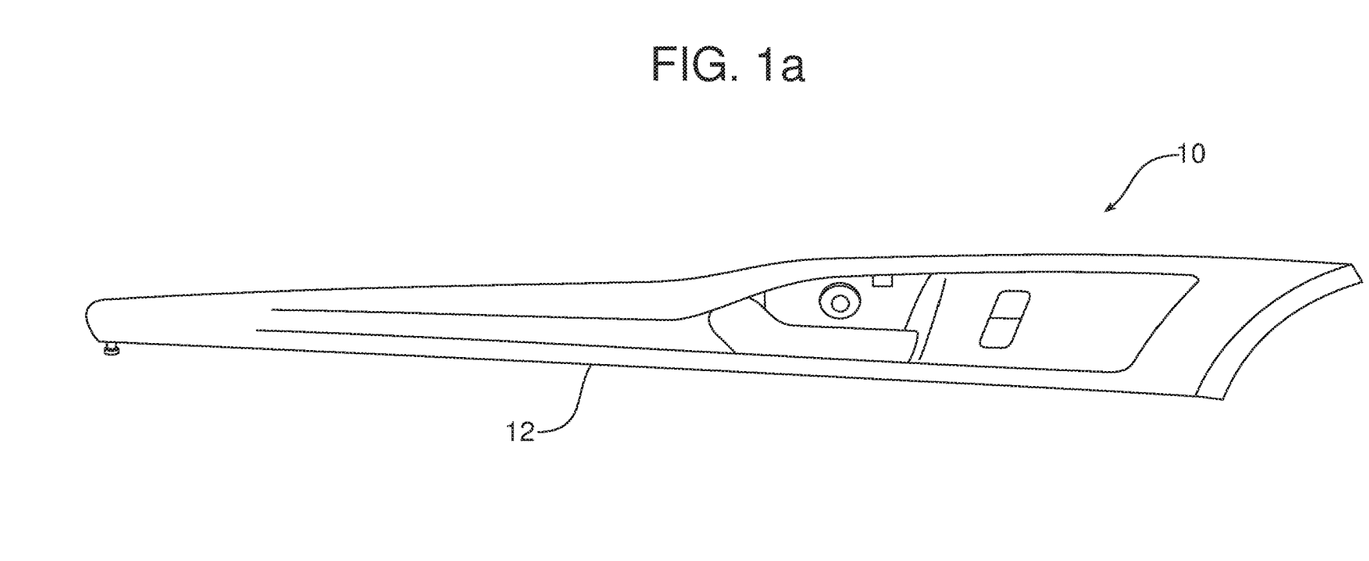
FIG. 1a is a perspective view of the A-side of a door trim applique.
Figure 1B:
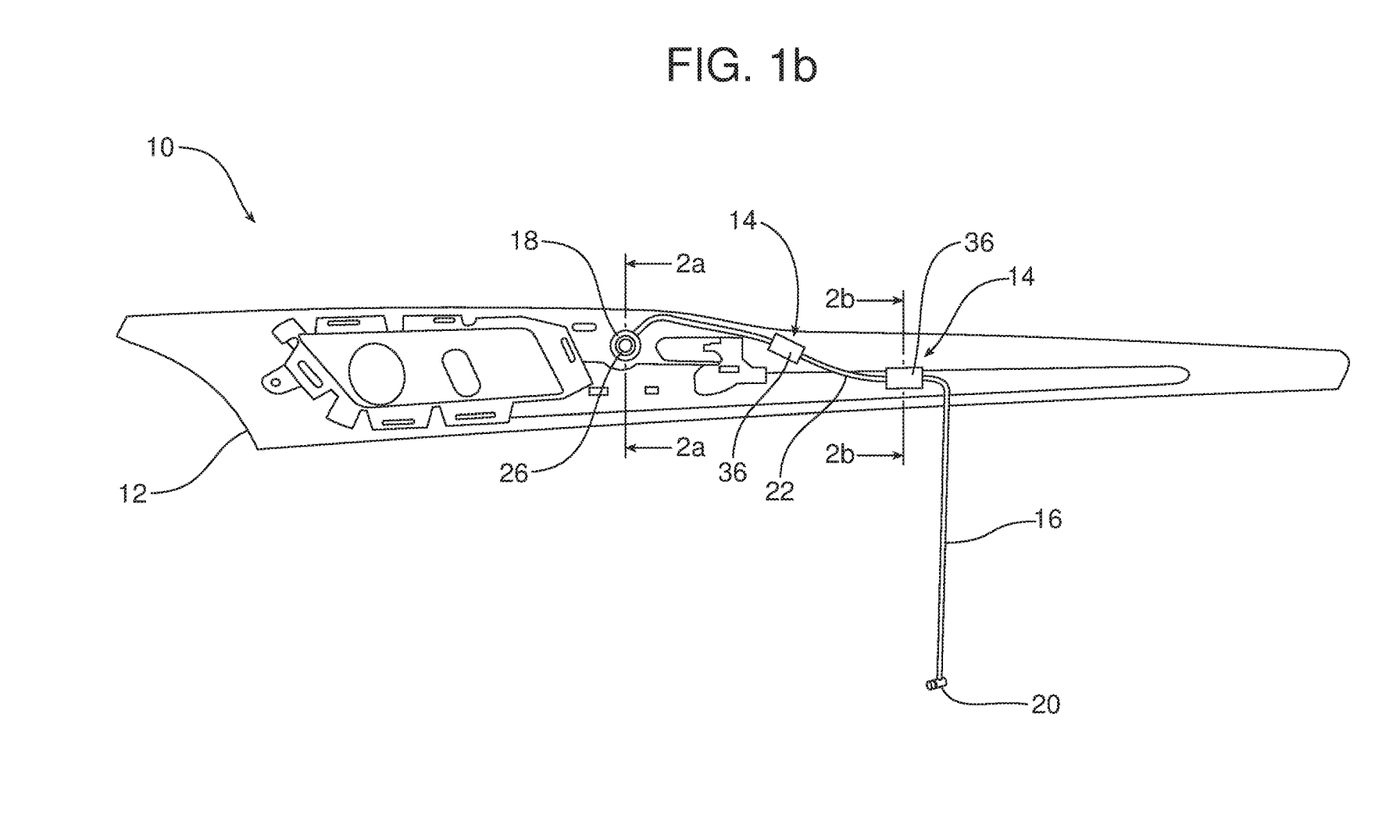

Reference is now made to FIGS. 1a and 1b which illustrate a new and improved trim applique and, more particularly, a door trim applique 10. The door trim applique 10 comprises a body 12 having an A-side illustrated in FIG. 1a and a B-side illustrated in FIG. 1b. The body 12 includes a conduit 14 on the B-side. The door trim applique 10 also includes a tether 16. The tether 16 includes a body attachment point in the form of a loop 18, a free end or distal end including a tether retention feature and an intermediate portion 22 extending between the body attachment point/loop 18 and the tether retention feature 20 at the free end. As illustrated in FIGS. 1b and 2b, the intermediate portion 22 of the tether 16 is freely received and held in the conduit 14 on the B-side of the body 12.

Figure 2A:
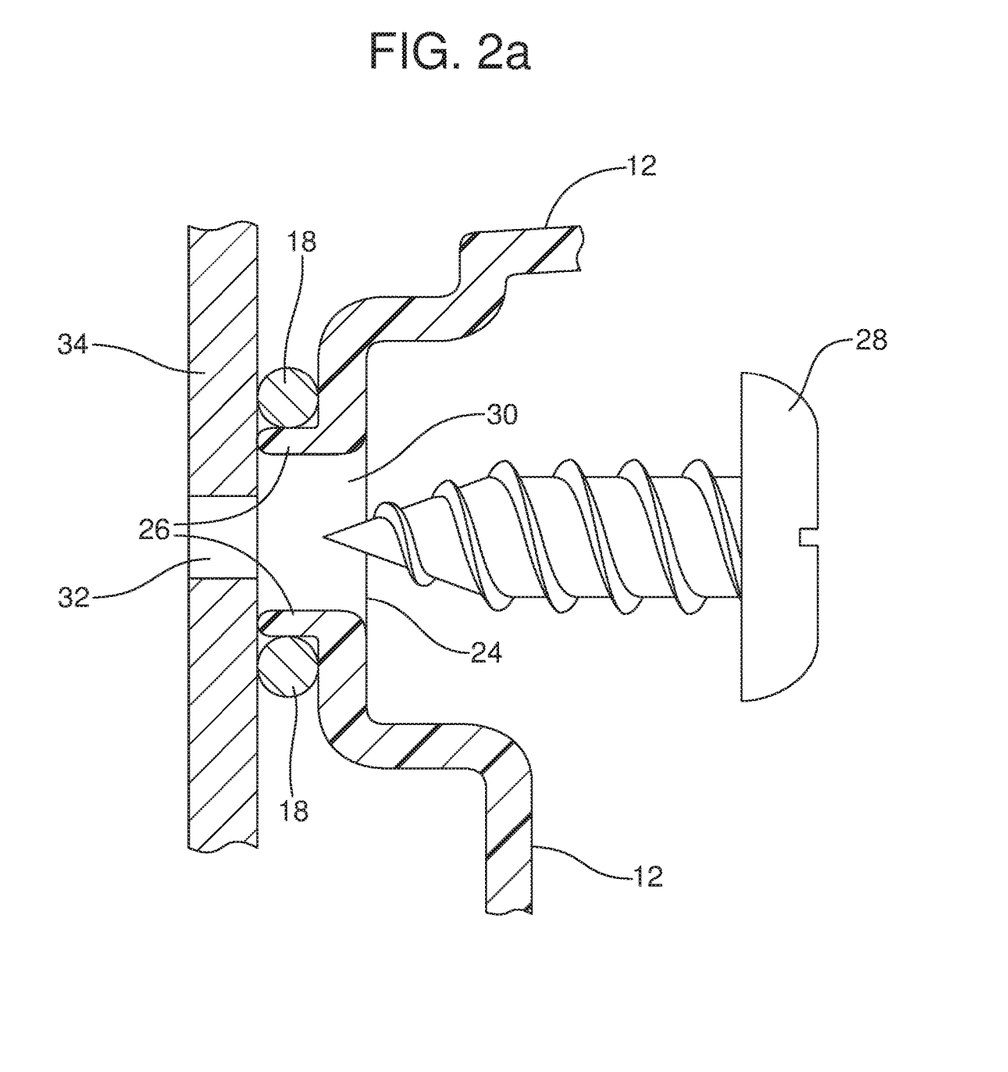
FIG. 2a is a cross-sectional view taken along line 2a-2a of FIG. 1b illustrating the tether boss and the loop in the tether at the body attachment point as well as the screw for securing the body to the sheet metal door inner.
Figure 2B:
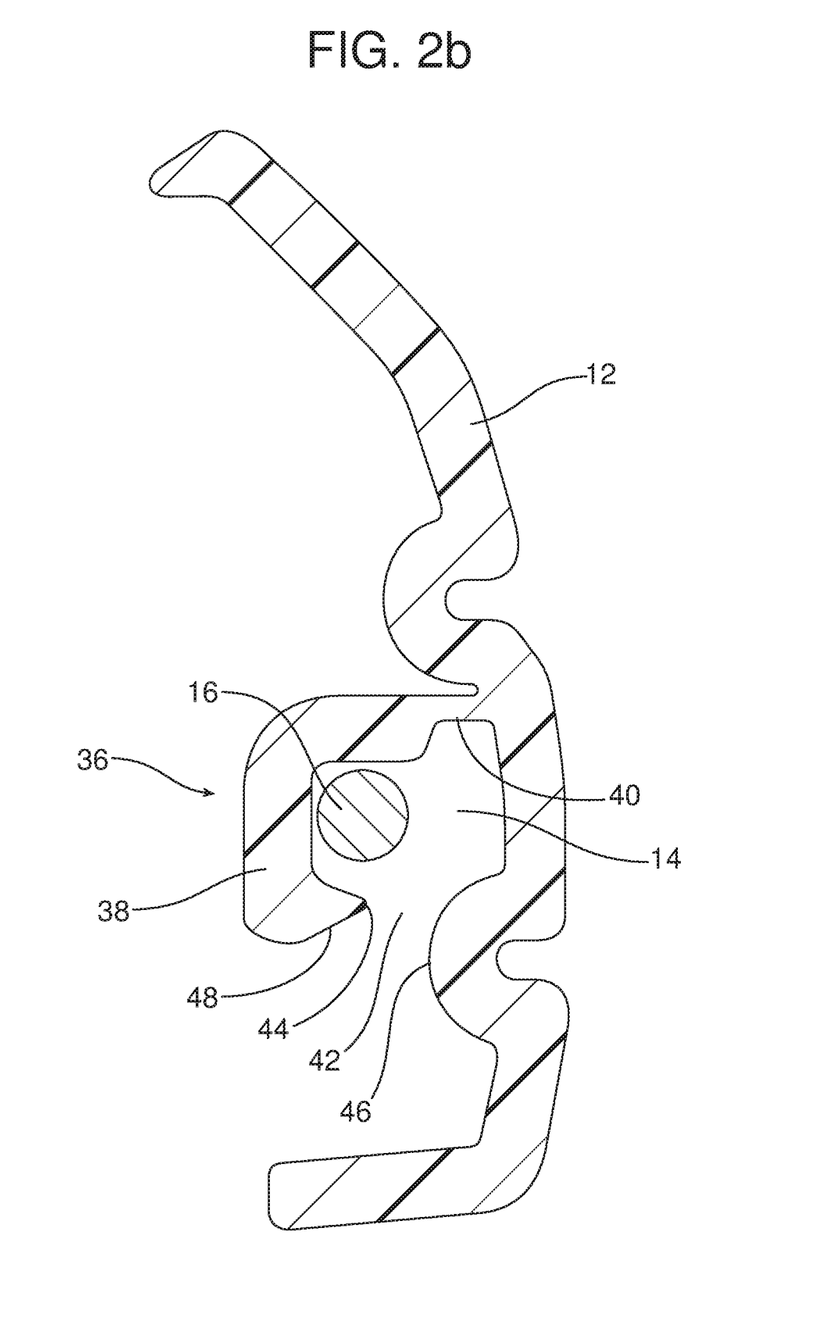
FIG. 2b is a cross-sectional view taken along line 2b-2b of FIG. 1b illustrating one resilient clip, formed integral with the body of the door trim applique, that receives the intermediate portion of the tether.

As best illustrated in FIG. 2a, the body 12 includes a tether boss 24 on the B-side having an upstanding flange 26. The body attachment point/loop 18 of the tether is received around the upstanding flange 26 of the tether boss 24. A fastener 28 is received through the aperture 30 in the tether boss 24 and, more particularly, in the upstanding flange 26 about which the loop is received. The fastener 28 is secured in the receiving aperture 32 provided in the sheet metal door inner 34 thereby providing a solid attachment point between the door trim applique 10 and the underlying sheet metal door inner. As should be appreciated, the body attachment point/loop 18 of the tether 16 is captured on the upstanding flange 26 of the tether boss 24 in the manner shown in FIG. 2a.

In the illustrated embodiment, the body 12 includes two resilient clips 36 molded into and integral with the body. Each of the resilient clips 36 defines a part of the conduit 14. More specifically, as best illustrated in FIG. 2b, each clip 36 includes an L-shaped lug 38 depending from a narrowed hinge portion 40. An entry opening 42 to the conduit 14 is defined between the distal end 44 of the lug 38 and a rounded projection 46. In the home or rest position of the L-shaped lug 38, the entry opening 42 is slightly narrower than the diameter of the tether 16 thereby functioning to resist passage of the tether through the opening.

The intermediate portion 22 of the tether 16 is easily inserted into the conduit 14 by pressing it through the entry opening 42. The sloped cam surface 48 helps to achieve this end. As this is done, the lug 38 pivots outward about the hinge 40 so that the entry opening 42 widens to allow passage of the tether 16 into the conduit 14. Once the tether 16 is received in the conduit 14, the resilient memory of the hinge 40 causes the lug 38 to spring back to the home or rest position, closing the entry opening 42 sufficiently to retain the tether 16 in the conduit 14.

Figure 3A:
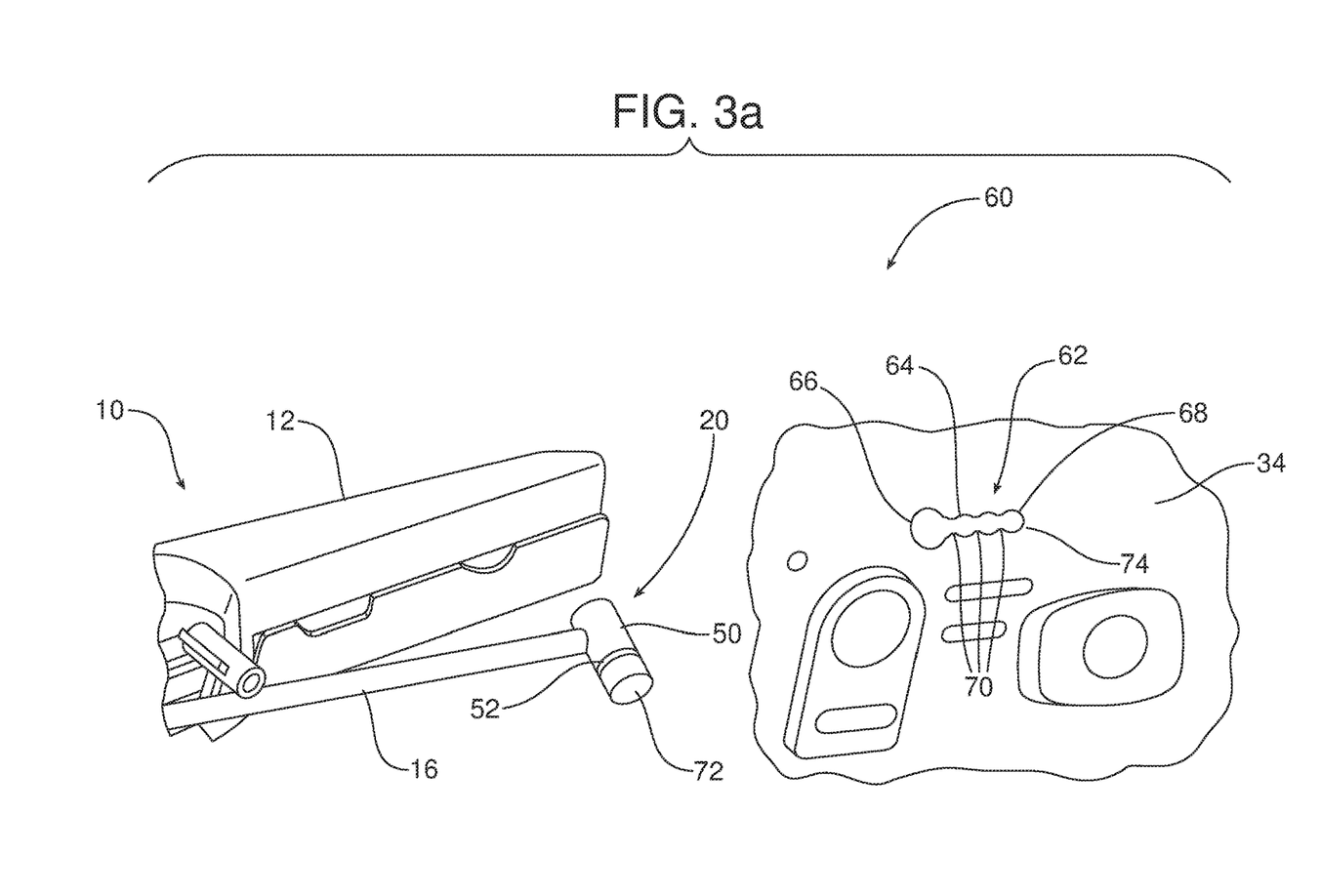
FIG. 3a illustrates the tether retention feature at the free end or distal end of the tether and the receiver in the form of a keyhole-shaped slot in the door inner that receives and holds the tether retention feature.

As best illustrated in FIG. 3a, the tether retention feature 20 provided at the free end or distal end of the tether 16 may comprise a cylindrical button 50. That cylindrical button 50 may include a continuous groove 52.

Figure 3B:
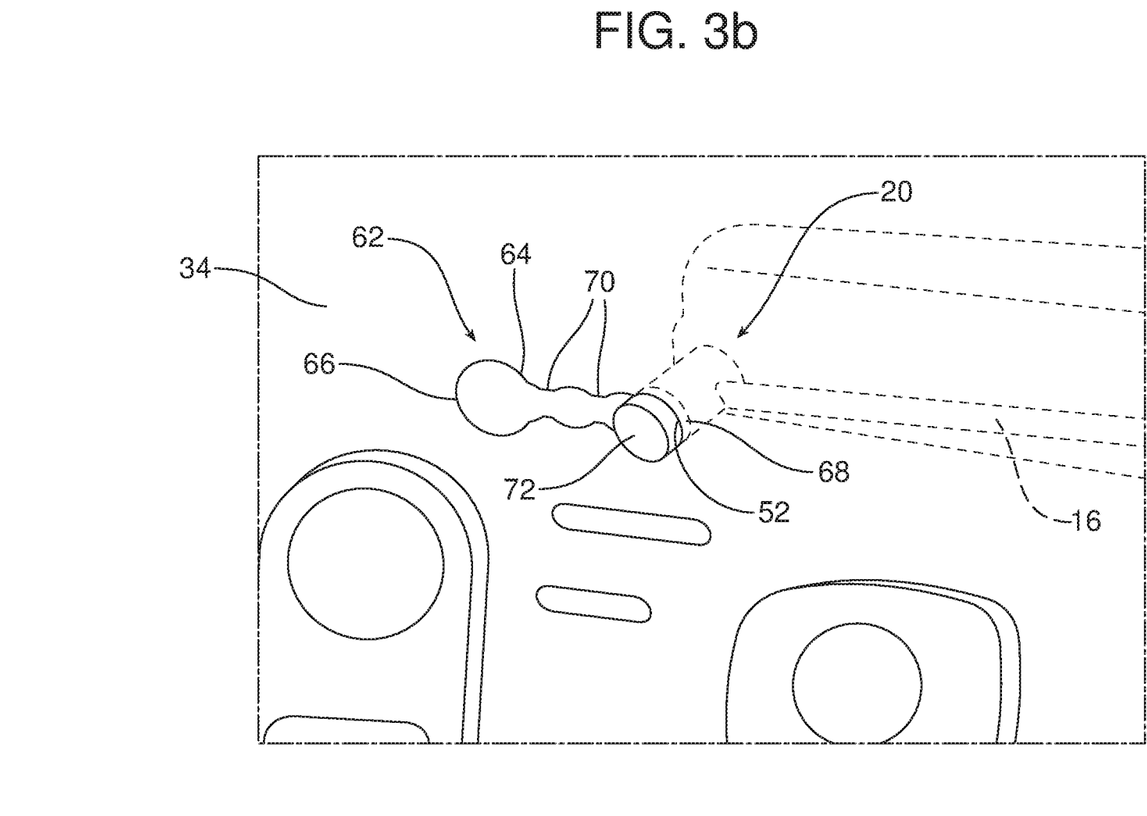
FIG. 3b is a view illustrating the connection between the tether retention feature and the keyhole-shaped slot.
Figure 3C:
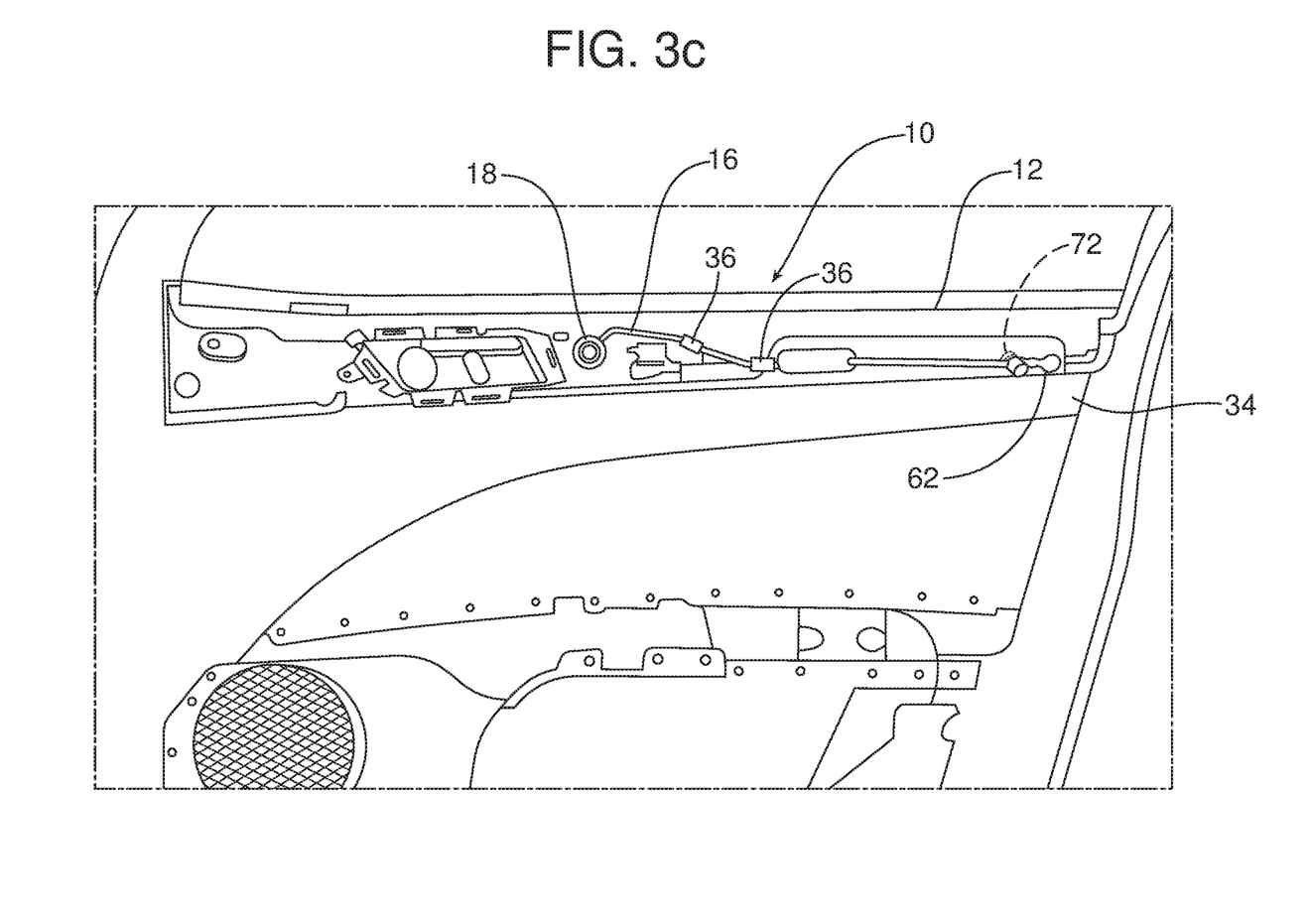
FIG. 3c illustrates the door trim applique following connection to the door inner.

As best illustrated in FIGS. 3a, 3b and 3c, the new and improved door trim applique retention system 60 includes the door trim applique 10 (previously described) and the sheet metal door inner 34. That sheet metal door inner 34 includes a receiver 62 adapted to receive the tether retention feature 20 at the free end or distal end of the tether 16. More particularly, as best illustrated in FIG. 3a, the receiver 62 comprises a keyhole-shaped slot 64. That keyhole-shaped slot 64 includes an enlarged entry opening 66 that communicates with an elongated notch. The notch 68 includes three sets of opposed nibs 70. As illustrated in FIG. 3b, the tether retention feature 20 is connected to the receiver 62 by inserting the end 72 of the cylindrical button 50 through the entry opening 66, aligning the continuous groove 52 with the notch 68 and then pulling the cylindrical button past the three sets of nibs 70 to the terminal end of the notch 68 so that a margin 74 of the door inner 34 defining the keyhole-shaped slot 64 is engaged with the walls of the groove 52 on the tether retention feature 20.

A method of securing the door trim applique 10 to the door inner 34 comprises a series of easily completed steps which allow for quick and simple assembly. That method includes providing the door trim applique 10 with the tether 16 having slack to allow for simple connection. The method also includes the step of attaching the free end and, more particularly, the tether retention feature 20 at the free end of the tether 16 to the receiver 62 provided on the door inner 34. This is done by inserting the tether retention feature 20 on the free end or distal end of the tether 16 in the tether receiver 62 on the door inner 34. More particularly, this comprises the steps of using a keyhole-shaped slot 64 in the door inner 34 as the tether receiver 62 and engaging a margin 74 of the door inner defining the keyhole-shaped slot with a groove 52 on the tether retention feature 20.

The method also includes the step of positioning the door trim applique 10 on the door inner 34 so as to align a boss 24 on the door trim applique 10 with a fastener receiver 32 on the door inner 34. As this is done the method includes taking up the slack in the tether 16. This is then followed by inserting the fastener 28 into the boss 24 and the fastener receiver 32 in the door inner 34. One takes up the slack in the tether 16 by sliding the body 12 of the door trim applique 10 over the tether 16. Here it should be noted that the conduit 14 provides sufficient clearance for the tether 16 to allow for free sliding action while the resilient lug 38 simultaneously maintains the tether 16 in the conduit 14.

The trim applique 10 and the door trim applique retention system 60 provide a number of benefits and advantages. The conduit 14 functions to hold the tether 16 while allowing for ease of connection and assembly. Since the slack is fully taken up upon final positioning of the door trim applique 10 on the door inner 34 (note absence of slack in tether as shown in FIG. 3c), the tether 16 functions to maintain the door trim applique 10 from early detachment from the door inner that might otherwise interfere with proper side airbag deployment in the event of a triggering side impact.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A door trim applique retention system, comprising:
   a door trim applique including a body and a tether, said tether having a body attachment point and a tether retention feature; and
   a door inner including a keyhole-shaped slot, said tether retention feature being held in said keyhole-shaped slot wherein said tether retention feature is a cylindrical button including a continuous channel that engages a margin of said door inner around said keyhole-shaped slot.

2. The door trim applique retention system of claim 1, wherein said body includes a tether boss and said body attachment point comprises a loop at a proximal end of said tether.

3. The door trim applique retention system of claim 2, wherein said tether retention feature is provided at a distal end of said tether.

4. The door trim applique retention system of claim 3, wherein said body includes a conduit and said tether includes an intermediate portion between said proximal end and said distal end received in said conduit.

5. The door trim applique retention system of claim 4, further including a fastener received through said tether boss and said loop, said fastener engaging a mounting point on said door inner.

6. The door trim applique retention system of claim 5, wherein said body includes an integral resilient clip defining said conduit.

7. A method of securing a door trim applique to a door inner, comprising:
   providing said door trim applique with a tether having slack and a free end;
   attaching said free end of said tether to a keyhole-shaped slot on a door inner;
   positioning said door trim applique on said door inner so as to align a boss on said door trim applique with a fastener receiver on said door inner;
   inserting a fastener into said boss and said fastener receiver;
   inserting a tether retention feature on said free end of said tether in the keyhole-shaped slot on said door inner; and
   engaging a margin of said door inner defining said keyhole-shaped slot with a groove on said tether retention feature.

8. The method of claim 7, including taking up said slack when positioning said door trim applique on said door inner.

9. The method of claim 8, including inserting said fastener through a loop on said tether when inserting said fastener into said boss and said fastener receiver.

* * * * *